United States Patent
Loge et al.

(10) Patent No.: US 7,184,438 B2
(45) Date of Patent: Feb. 27, 2007

(54) TASK MANAGEMENT METHOD FOR A PACKET SWITCH ROUTING AUTOMATON FORMING PART OF A SECURED PACKET-SWITCHING TRANSMISSION NETWORK

(75) Inventors: Alain Loge, Boulogne Billancourt (FR); Christian Pitot, Boulogne Billancourt (FR)

(73) Assignee: Thales, Paris (FR)

( * ) Notice: Subject to any disclaimer, the term of this patent is extended or adjusted under 35 U.S.C. 154(b) by 1046 days.

(21) Appl. No.: 10/205,399

(22) Filed: Jul. 26, 2002

(65) Prior Publication Data

US 2003/0076780 A1 Apr. 24, 2003

(30) Foreign Application Priority Data

Jul. 27, 2001 (FR) .................................. 01 10121

(51) Int. Cl.
*H04L 12/28* (2006.01)
(52) U.S. Cl. .................... 370/392; 370/351; 370/389
(58) Field of Classification Search .................. None
See application file for complete search history.

(56) References Cited

U.S. PATENT DOCUMENTS

| 5,375,208 | A | 12/1994 | Pitot |
| 5,701,315 | A | 12/1997 | Pitot et al. |
| 5,719,577 | A | 2/1998 | Pitot et al. |
| 5,805,588 | A * | 9/1998 | Petersen ..................... 370/356 |
| 5,889,778 | A | 3/1999 | Huscroft et al. |
| 6,046,644 | A | 4/2000 | Pitot et al. |
| 6,204,786 | B1 | 3/2001 | Bieth et al. |
| 6,611,522 | B1 * | 8/2003 | Zheng et al. .......... 370/395.21 |
| 6,907,001 | B1 * | 6/2005 | Nakayama et al. ......... 370/230 |

FOREIGN PATENT DOCUMENTS

EP 0 472 408 A2 2/1992

* cited by examiner

*Primary Examiner*—Phirin Sam
(74) *Attorney, Agent, or Firm*—Oblon, Spivak, McClelland, Maier & Neustadt, P.C.

(57) ABSTRACT

This method consists in making a routing automaton carry out verifications on the integrity of the packets arriving at the packet switch, their periods of stay in the packet switch, their matching with the virtual paths that they claim to take as well as the routings proper, within the packet switch, of the datagrams that have satisfactorily undergone the verification. The routing automaton is provided with a random access memory of instructed values containing a table of virtual path local descriptors. The processing time of the automaton is divided into a repetitive sequence of time slots individually allocated to the different input ports of the packet switch.

24 Claims, 5 Drawing Sheets

TASK MANAGEMENT METHOD FOR A PACKET SWITCH ROUTING AUTOMATON FORMING PART OF A SECURED PACKET-SWITCHING TRANSMISSION NETWORK

BACKGROUND OF THE INVENTION

1. Field of the Invention

The present invention relates to packet-switching transmission networks designed to convey vital security information with special requirements in terms of guarantees and transportation deadlines. Security transmission networks of this kind have many possible fields of application including the interconnection of onboard equipment in an aircraft for the exchange of vitally important instructions and information.

2. Description of the Prior Art

A packet-switching transmission network is generally called an ATM (Asynchronous Transfer Mode) network or switched Ethernet. It consists of a set of switches or interconnection nodes, joined by transmission links, which may or may not be wired. These nodes constitute a meshing of the space in which the entities that have to communicate with one another are distributed.

To be transmitted on a packet-switching transmission network, a piece of information must undergo one or two successive shaping operations: a digital shaping operation and an analog shaping operation.

The digital shaping operation is designed to make it possible for the packet switches to manipulate the information to be transmitted. This digital shaping, after an operation to digitize the information to be transmitted, results in the constitution of binary data packets or datagrams compliant with a certain format, with one or more message bits and one or more service bits fields containing several instructions useful for routing within the network, including identifiers or the packet addressee entities.

Analog shaping relates to the packets or datagrams that result from the digital shaping operation. The analog shaping operation gives these packets the form of electrical or optical transmission signals adapted to the physical characteristics of the transmission links interconnecting the switches of the network to one another and with the communicating entities.

The packet transmission networks are differentiated from one another chiefly by the use of variably sized packets (64 to 1518 bytes) for the Ethernet and by the use of fixed-size packets for the ATM networks. Hereinafter, it is assumed that the packets may have any size whatsoever, so that the description can remain at a general level.

A network switch carries out chiefly the following operations:

an operation of detection and demodulation, at each of its input/output ports, of the transmission signals that reach it through the transmission links with which it is directly connected in order to restore the datagram shape to the information that reaches it.

the temporary storage, in a buffer memory, of the datagram traffic received by all the input/output ports pending the execution of routing to one or more output ports of the switch, an analysis of the service bits of each datagram in order to deduce a distribution profile determining the output ports to which the datagram considered must be routed, the execution, as soon as possible, of the distribution profile consisting of a retrieval, in a buffer memory, of the datagram concerned and its presentation at the desired output ports, the remodulation of the datagrams at the output ports in order to give them back the shape of a transmission signal adapted to their conveyance on the transmission links connected to the output ports.

To fulfill these different tasks, a packet switch generally comprises the following peripheral equipment at each of its input-output ports: an individual modulator-demodulator circuit known as a MAC (Medium Access Control) circuit providing the interface, in both directions, between the datagrams circulating internally and the transmission signals that correspond to them externally, on the physical interconnection links of the network directly connected to the input/output ports considered, as well as a logic automaton for the management of sending queues that resolves conflicts between datagram forwarding requests that are far too close to each other to be satisfied immediately. The packet switch furthermore comprises, centrally, a buffer memory consisting of a multiple random-access memory storing the datagrams received by the packet switch for the period of their routing, a central sequencer for the addressing of the buffer memory to make it work as several circulating memory banks, with one bank per incoming port, and a central routing automaton determining a distribution profile, namely the list of input-output ports of the network switch by which a datagram must be re-sent, prepared as a function of the localization of the packet switch concerned within the packet switch transmission network and service data pertaining to this datagram, essentially the identity of the destination entities.

The increasing importance of the security aspect has led to the adoption, in packet-switching transmission networks, of measures to guarantee the most efficient possible conveyance of a piece of information within an maximum deadline, even in the event of downgraded operation, through the greatest possible elimination of risks of congestion in the network. These measures act at two levels: the packet or datagram level and the level of the virtual paths followed by the datagrams within the network, a virtual path being associated with a particular data stream having the same sender and addressee entities and being defined by instantaneous states taken by the switches of the network when they are crossed by the datagrams belonging to this information stream.

The network anti-congestion security measures taken at the datagram level consist of the verification of the integrity and freshness of the datagrams during their stay within the packet switches of the network, namely all the packet switches or only some of them, and the rejection of the packets that are not integrated or have stayed far too long in a packet switch, so as not to unnecessarily encumber the transmission links of the network with datagrams that have become unusable by the addressee entities.

The verification of the integrity of the datagram is based on the compliance of the datagram, as perceived at a packet switch of the network, with a report located in its service bits and consisting of information on the type of packet or redundancy information given by an error correction code.

The verification of the freshness of a datagram at the packet switch is based on the comparison of the current time with the date of reception of the datagram by the packet switch considered. When a datagram stays far too long in a packet switch before being forwarded, there is a risk that the packet switch will have its storage possibilities over-stretched and that it will mistake datagrams for one another. It is therefore necessary to eliminate every reference to a datagram once its stay in a packet switch tends to stretch out abnormally.

The network anti-congestion safety measures taken at the virtual path level are of two kinds. They consist, firstly, in verifying that, when a datagram passes through a packet switch, it is truly following an authorized virtual path, failing which it is rejected so that it does not unnecessarily encumber the transmission links with packets that will not be properly exploited by the addressee entities because they have been poorly routed. These measures consist, secondly, in keeping the virtual path bit rates, at the different packet switches, below the authorized maximum values, if necessary by means of shedding operations through the authoritative elimination of datagrams in excess. This is done in order to limit an operating fault on the part of a sender entity or a packet switch solely to the virtual paths that are assigned to it.

The verification of the fact that a datagram matches the virtual path that it takes at a packet switch is based on verification of the compatibility of the port by which the datagram is received at a packet switch with the virtual path that was originally assigned to the datagram. This originally assigned virtual path is deduced from service bits contained in the datagram that identify the addressee entities of the datagram and possibly other service bits identifying the sender entity or the type of datagram.

The data bit rate of a virtual path is kept below the maximum values authorized at the different packet switches that it crosses. This is done by monitoring of its real bit rate at these packet switches, tallying the datagrams that it conveys, this tallying taking account of the fact that the datagrams often sent out at a regular pace by a sender entity may be affected by a variable level of jitter owing to the possible existence of queues at the packet switches, and the assertive or authoritative limiting of the real bit rate to a level below the maximum bit rate through the elimination of the datagrams in excess.

These measures seek to eliminate the risks of loss or delay in the conveyance of information as a result of congestion in the network. Other measures are designed to ensure that information which, despite precautions, have lost their integrity during conveyance, are rejected so as not to encumber the transmission links and unnecessarily take up processing time in the packet switches.

Since it is useful to reduce the number of datagrams stored in the central buffer memory of a packet switch to the maximum extent, it is advantageous to verify the integrity of a datagram at the input port by which it reaches the packet switch considered. Indeed, this enables this datagram to be eliminated before it is presented to the central buffer memory if a lack of integrity should detected. The function of verifying the integrity of each packet received is then entrusted to the MAC circuits whose structure is adapted to this purpose.

For all the other anti-congestion safety measures of the network, it is advantageous, for cost reasons, to entrust their implementation to the central routing automaton. However, this greatly increases the workload of the central routing automaton and entails an equivalent increase in the computation power of this automaton.

SUMMARY OF THE INVENTION

It is an aim of the present invention to facilitate the implementation of the anti-congestion safety measures by means of a central automaton responsible for routing within a packet switch.

The present invention is also aimed at the low-cost execution, at the packet switch level in a packet transmission network, of anti-congestion security measures reinforcing the security of the network.

An object of the invention is a method of task management for a routing automaton of a packet switch forming part of a secured packet-switching transmission network and comprising several input ports and several output ports serving as points of access to incoming and outgoing data traffic using physical transmission links externally connected to the packet switch, in the form of transmission signals containing datagrams, said datagrams containing message bits and service bits containing routing instructions used for the definition, for each datagram, of a path known as a "virtual" path to be followed within the network in order to reach its destination. This task management method consists firstly in providing said routing automaton with a table, stored in random access memory, of local descriptors of the virtual paths following the packet switch considered, a local descriptor assigned to a given virtual path containing a distribution profile listing the output ports of the packet switch considered used by the virtual path concerned, a reception profile listing the input ports of the packet switch that can be used by the virtual path concerned, information on shape and bit rate constraints imposed on the datagrams taking the virtual path concerned and chronological information with which to determine the earliest date for a licit arrival of the next datagram taking the virtual path concerned and, furthermore, in sharing the processing time of said routing automaton in a repetitive sequence of time slots, some of which are distributed between the different input ports, each of them being individually assigned to a particular input port and being reserved for operations forming part of the routing processing of the datagrams received by its assigned input port, this processing consisting, for a datagram, of:

the reading, in the random access memory, of the virtual path local descriptor assigned to the datagram received, identified in the table of local descriptors by means of the service data drawn from the datagram received, the performance, on the datagram, of the anti-congestion safety verification operations taking account of its date of reception by the packet switch, the identity of the input port that was used by it to access the packet switch and the information contained in the local descriptor read, either the rejection of the datagram being processed when one of the preceding verification operations is negative, or, when all the previous verification operations are positive, the updating of the information on the read local descriptor pertaining to the date of reception of the datagram being processed and to the "phase advance credit" or "account value" for the next datagram taking the virtual path concerned and the proposing of the datagram being processed to the output ports listed in the distribution profile of the read local descriptor, with a view to the re-sending of this datagram by its output ports.

Advantageously, the anti-congestion safety verification operations consist in:
- verifying that the input port used by the datagram being processed to access the packet switch belongs to the reception profile of the local descriptor read,
- verifying that the seniority of the date of reception of the datagram being processed with respect to the current date does not exceed a certain threshold, and
- verifying that the date of reception of the datagram being processed is within the limits permitted by the maximum bit rate authorized for the virtual path corresponding to the local descriptor read, this verification being done in taking account of its account value.

Advantageously, the virtual path local descriptors all have the same length.

Advantageously, the virtual path local descriptors are organized in the form of at least one word protected by an error detection and correction code enabling the detection and correction of single errors and the detection of multiple errors, time slots being reserved in the processing time of the routing automaton for overhead tasks including a periodic verification of the integrity of the elements of the table of local descriptors, their possible correction or their invalidation if the possibilities of correction are over-stretched, where the invalidation of a local descriptor consists in giving it a specific value representing its non-validity.

Advantageously, the overhead task devoted to the verification of the integrity of the local descriptors includes the detection of the invalidated local descriptors and their rewriting from an archival memory located in the packet switch considered or at another place of the packet-switching transmission network.

Advantageously, the specific value representing non-validity for a virtual path local descriptor is localized at the distribution profile and corresponds to an unused distribution profile such as a vacant distribution profile.

Advantageously, the overhead tasks for which the time slots are reserved in the processing time of the routing automaton include the initialization of the table of the local descriptors when the packet switch is started up, this initialization being done by a registration, in the random access memory, of data drawn from an archival memory that is localized or not localized in the packet switch.

Advantageously, the overhead tasks for which the time slots are reserved in the processing time of the routing automaton include a verification, in the event of the use of a restricted time-scale, of the commensurability, with the current time, of the dates contained in the local descriptors leading to an explicit indication of the dates that prove to be non-commensurable.

Advantageously, the distribution profiles in the virtual path local descriptors are permanently fixed during the designing of the packet-switching transmission network except for one bit reserved for a possible output port assigned to maintenance, whose value may be modified by the routing automaton.

Advantageously, a virtual path local descriptor takes a standard format consisting of four successive binary words: one "variables" word and three "constants" words:
- the variables word essentially devoted to dating being rewritten at the appearance of each new datagram assigned to the virtual path concerned and containing chiefly variables pertaining to the date of reception of the last datagram that has reached the packet switch considered through the same virtual path concerned and to the account value given to the new datagram that has appeared, these two pieces of information being capable of being combined, if necessary, in the form of a single variable expressing the earliest date, for a licit arrival of the next datagram,
- a first constants word pertaining chiefly to the maximum bit rate and the maximum jitter allowed for the virtual path considered at the level of the packet switch concerned and to the maximum length authorized for the datagram
- a second "reception profile constants" word listing the input ports of the packet switch concerned, authorized to receive a datagram assigned to the virtual path considered, and
- a third "distribution profile constants" word listing the output ports of the packet switch concerned that have to re-send a datagram assigned to the virtual path.

Advantageously, a virtual path local descriptor takes either a standard format or a special format:
- the standard format which consists of four successive binary words, one "variables" word and three "constants" words: a variables word essentially devoted to dating being rewritten at the appearance of each new datagram assigned to the virtual path concerned and containing chiefly variables pertaining to the date of reception of the last datagram that has reached the packet switch considered, through the same virtual path concerned, and to the account value accruing to the new datagram that has appeared, a first "specification constants" word pertaining chiefly to the maximum bit rate and the maximum jitter allowed for the virtual path considered at the level of the packet switch concerned and to the maximum length authorized for the datagram, a second invariant "reception profile constants" word listing the input ports of the packet switch concerned, authorized to receive a datagram assigned to the virtual path considered, and a third "distribution profile constants" word listing the output ports of the packet switch concerned that have to re-send a datagram assigned to the virtual path, and
- the special format which is distinguished from the standard format by the fact that the second reception profile word comprises a definition reduced to only one reception profile port and, in the place left free by the reduced definition of the reception profile, an addressing index to point to a word of the dating variables common to several virtual paths.

Advantageously, in the two virtual path local descriptor formats, the standard format and the special format, all the words are protected by an individual error correction and detection code.

Advantageously, in the two virtual path local descriptor formats, namely the standard format in the special format, all the "constants" words are protected individually against errors, firstly by a Hamming code combining their addresses in random access memory and their contents and, secondly, by an error detection and correction code.

Advantageously, in the two virtual path local descriptor formats, namely the standard format in the special format, the "specification constants" word contains an identifier of the format type concerned.

Advantageously, in the two virtual path local descriptor formats, namely the standard format and the special format, the "dating variables" word contains a variables field designed to count up the rejection situations.

Advantageously, in the two virtual path local descriptor formats, namely the standard format and the special format, the "dating variables" word comprises a flag enabling the addition on non-addition, to the distribution profile defined by the "distribution profile constants" word, of an output port assigned to maintenance operations.

Advantageously, in the two virtual path local descriptor formats, namely the standard format and the special format, the "specification constants" word contains a field devoted to a piece of information on priority pertaining to the different priorities between the virtual path of a table of local descriptors.

Advantageously, the specific value representing non-validity for a virtual path local descriptor in standard format or special format is obtained by setting their three "constants" words at one.

Advantageously, in the presence of a table of virtual path local descriptors in the standard and special formats, the repetitive sequence of time slots allocated individually to the different input ports during the processing cycle of the routing automaton, comprises, for a same input port, a time slot assigned to read access operations for reading "constants" words of the local descriptor addressed and assigned to taking account of the information that they contain, then a time slot for carrying out read access operations for reading a "variables" word, either of the local descriptor accessed in the case of a standard format or, possibly, in the case of the special format, of another descriptor located by means of the addressing index, and for the exploitation of information contained in this "variables" word and, finally, a rewriting time slot for the updating of the variables word read, these time slots being slots that can be intermingled with time slots allocated to the other input ports to enable a multitask execution of the elementary operations implied by a routing and to reduce the total routing time of all the datagrams received.

Advantageously, when the packet switch comprises a central buffer memory scanned periodically in write mode by an address sequencer that makes it work like a plurality of circulating memories, one circulating memory per input port assigned to the traffic of information incoming by this port, the address sequencer also provides the repetitive sequence of time slots distributing the routing automaton processing time between the different input ports of the packet switch so that the buffer memory scanning cycle and the repetitive sequence of the time slots for the sharing of the routing automaton processing time are synchronized.

BRIEF DESCRIPTION OF THE DRAWINGS

Other features and advantages of the invention shall appear from the following description of an embodiment given by way of an example. This description will be made with reference to the appended drawing, of which:

FIGS. 3 and 4 illustrate formats in which sets of information useful for the routing are stored, these sets being designated by virtual path local descriptors, FIG. 6 illustrates an exemplary sequencing that can be used to manage the working of an automaton, providing for the routing of the packets or datagrams at the node of the transmission network.

MORE DETAILED DESCRIPTION

Figure 1:
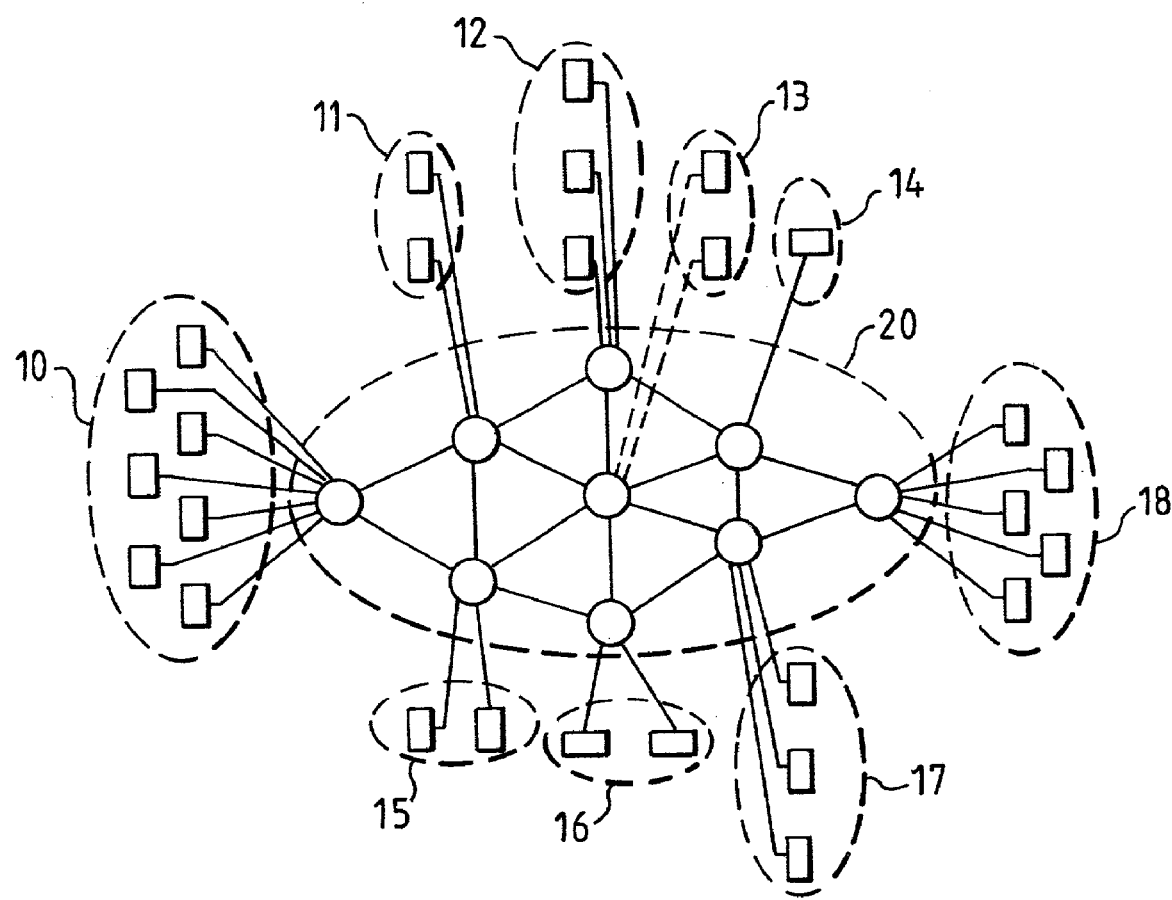
FIG. 1 shows an exemplary topology of the packet transmission network.

FIG. 1 shows different sets of devices 10 to 18 communicating with one another by means of a packet-switching transmission network 20. The sets of devices 10 to 18 are of unequal importance. They are geographically dispersed over a region covered by the packet-switching transmission network 20. The packet-switching transmission network 20 is diagrammatically shown by a meshing of interconnection nodes or packet switches represented by circles, and physical transmission links represented by straight-line segments interconnecting the packet switches with one another and with the devices. Each device represented by a rectangle is connected to the packet-switching transmission network 20 at one or more packet switches placed close by, through a specialized terminal not shown and one or more physical transmission links.

In order that they may be handled within the packet transmission network, the messages exchanged by the devices undergo two successive shaping operations. These are, firstly, a digitization operation that gives them the aspect of a bit sequence followed by a packing of the sequence of bits obtained in the form of one or more successive packets or datagrams adapted to the routing processing operations performed within the packet switches, and then a shaping of the datagrams as electrical or optical transmission signals so that they are conveyed by the physical interconnection links.

The datagrams are constituted by a sequence of message bits preceded by a sequence of service bits containing information useful for their routing within the packet switches crossed. They comply with a special format or protocol adapted to the characteristics of the combinatorial and/or sequential logic circuits performing the routing operations within the packet switches.

The electrical or optical signals used to convey the datagrams on the interconnecting physical transmission links connecting the packet switches to one another and to the devices are adapted to the physical characteristics of the links used.

At the ends of the transmission links, whether at the level of the terminals connecting the devices to the network or at the level of the input-output ports of the packet switches, there are demodulation and modulation circuits that convert a transmission signal received through a physical link into its corresponding datagram and that, conversely, convert a datagram handled at an equipment terminal or packet switch into a transmission signal suited to the physical transmission links.

A datagram and received and demodulated at an input-output port of the packet switch must be diverted, within this packet switch, to one or more input-output ports in order to be re-sent on one or more other physical transmission links directly connected to this packet switch in order to bring it closer to its final destination on destinations. This operation, known as a routing, is the main task taken up by a packet switch. This execution may take an amount of time that varies according to the congestion at the output re-sending ports because several datagrams may be received simultaneously by one and the same packet switch on several of its input ports and may have to be diverted in order to be re-sent, on one and the same output port. This may prompt a traffic jam at the output port dictating a temporary storage of the incoming data traffic and a queue management at the output ports to prevent a loss of datagrams.

Figure 2:
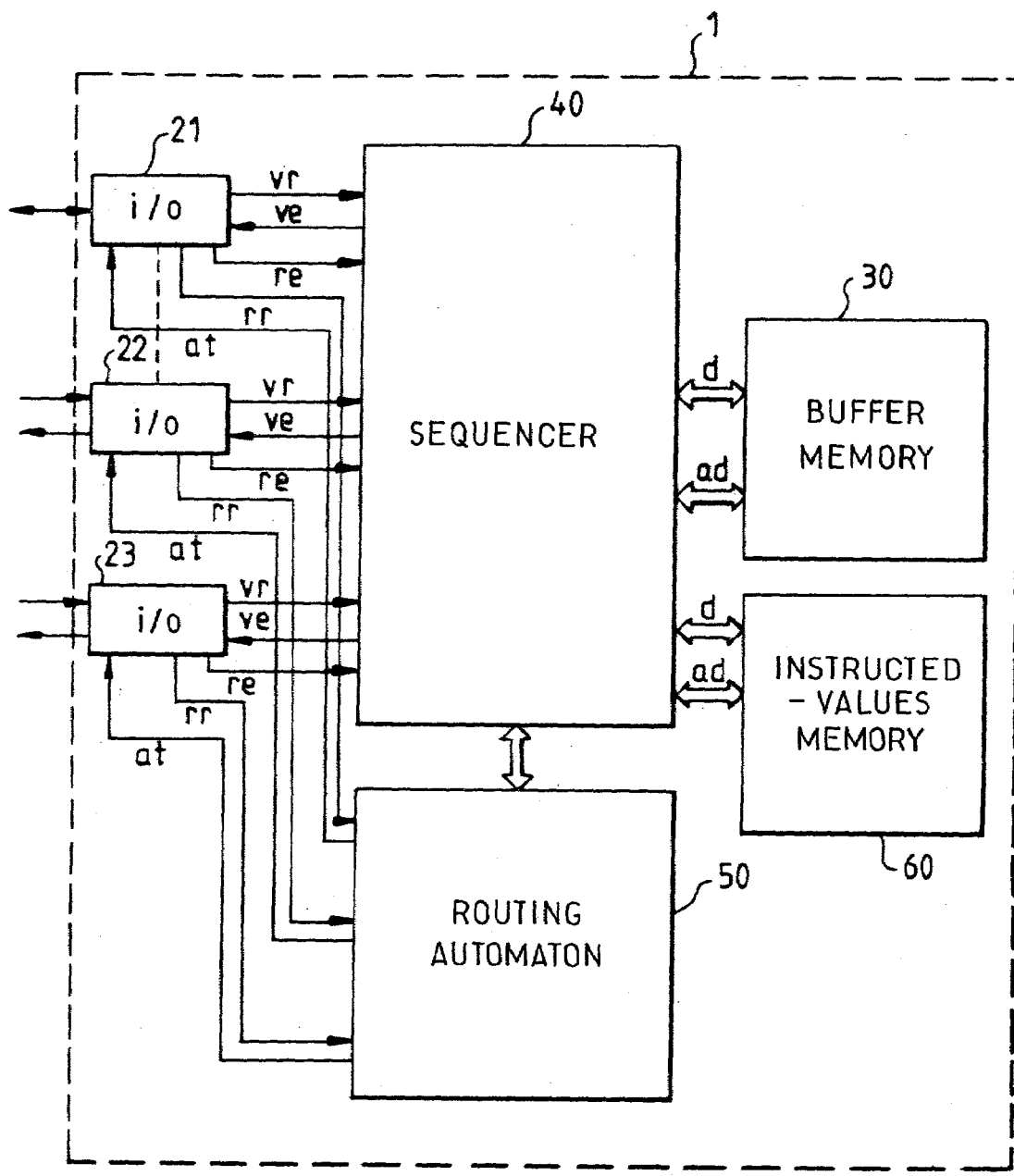
FIG. 2 exemplifies a packet-switching architecture.

FIG. 2 illustrates a possible architecture for a packet switch 1. This packet switch communicates, through input-output (I/O) ports 21, 22, 23 with other packet switches or with devices connected to its network by means of one way or two-way physical transmission links. The figure shows three input-output (I/O) ports 21,22,23 but their number is not restricted. This number is adapted to the number of connections planned for the packet switch considered. An input-output port provides for the interface with a two-way physical transmission link or with physical transmission links, one used for sending and the other for reception.

In the example shown, the input-output port (I/O) 21 interfaces with a two-way physical transmission link and the input-output I/O ports 22 and 23 provide the interface with two one-way physical transmission links, one used at reception and the other for sending. The interface is provided by carrying out the tasks of modulation and demodulation, and a task of managing the list of packets that are waiting to be re-sent. In the modulation task, the packets to be re-sent are put in the form of a transmission signal with physical characteristics adapted to those of the transmission link used when the packet is sent and reaching the input-output port concerned. The demodulation task consists in extracting the packets contained in the transmission signals received at the physical transmission link used at reception and reaching the input-output (I/O) port concerned. In the waiting list management task, the packets to be re-sent are placed in the queue, one behind the other, when they arrive at an excessively fast rate with respect to the bit rate of the physical transmission link used at re-sending.

An input-output (I/O) port is connected to the internal processing circuits of the packet switch into which it is fitted, by means of a data receive channel, a data-sending channel and several control ports. Through the data reception channel vr, it places the incoming binary data traffic, reaching the packet switch through the physical transmission link that it controls, at the disposal of its packet switch. The data-sending channel will enable it to receive the datagrams that it must re-send and that come from other internal circuits of the packet switch. The control ports, including a routing request port rr, a packet allocation port and a port for requesting packets to be sent, are used for the management of the packet reception, the management of the re-sending of the packets and the management of the queue of the packets to be re-sent.

Apart from its input-output (I/O) ports 21,22,23, the packet switch comprises: a buffer memory 30 used for the storage, over a certain period of time, of the incoming data traffic, a sequencer 40 managing the addressing of the buffer memory 30 and the operations to access this buffer memory, a routing automaton 50 and an instructed-values or set-values memory 60 from which the routing automaton 50 draws directives.

The buffer memory 30 is a collection of circulating memories whose presence is dictated by the obligation to manage waiting lists at the input-output (I/O) ports for the re-sending of the packets and, to a smaller extent, by the routing request processing time. Each circulating memory is reserved for the writing of a determined incoming data traffic, hence related to a determined input-output I/O port, but it may be read without distinction by all the input-output (I/O) ports.

The buffer memory 30 is a random access memory constituted by a set of banks of registers having lengths equal to that of the binary words given by the input-output (I/O) ports 21, 22, 23 of the digital circuits used in the packet switch, this length being chosen as a function of the processing capacity, in an operation, of the digital circuits used in the packet switch. This set of banks of registers is divided into as many separate groups as there are input-output ports, each group being assigned in write mode to a particular input-output port scanned in write mode cyclically, at a rate sufficient to take the bit rate of the data traffic to which it is assigned and being read at request by all the input-output ports.

The sequencer 40 addresses the buffer memory 30 so as to make it work like a set of circulating memories. For this purpose, to each input-output port of the packet switch, it allocates an invariant periodic frame for write access to an imposed group of banks of registers of the buffer memory and a periodic frame for read access to a group of banks of registers for which a choice is allowed, the periodic read-access frame following the same scanning order as the periodic frame used in write mode but with a phased shift left to the choice of the input-output port.

The routing automaton 50 is a combinatorial and/or sequential logic circuit, for example a microprocessor, that deals with the routing requests sent out by the different input-output (I/O) ports 21, 22, 23 in order to extract therefrom the routing profiles associated with each datagram during reception by the packet switch and, from these routing profiles, to generate instructions or distribution profiles listing the input-output (I/O) ports of the packet switch that has to re-send the datagrams.

The instructed-values memory 60 contains information needed by the routing automaton to efficiently carry out its task. Like the buffer memory, its addressing is managed by the sequence 40.

The path taken by a datagram within the network to travel from the device that has sent it to the addressee devices is defined by the configurations of the packet switches at the points in time when it crosses them. This path is called a virtual path. It is defined during the designing of the network, as a function of the locations of the sender devices and of the addressee devices. In general, a virtual path that makes a connection, within a packet-switching transmission network, between a sender device and one or more addressee devices may have a trajectory whose layout changes slowly in the course of time according to the instructions from the traffic control unit seeking to balance the rates of activity of the different packet switches of the network. Whether the layouts of the virtual paths are fixed or not, they may be considered to the invariant over a time scale far greater than that taken to convey a datagram. This enables the one-to-one local association, at a packet switch, of a predefined distribution profile with each virtual path passing through this packet switch. This predefined distribution profile lists all the output ports that must re-send the datagrams, so that the main task of a routing automaton is to determine the virtual path to which the datagram being routed belongs on the basis of service data contained in this datagram, and to search the local instructed-values memory (60 FIG. 2) for the corresponding distribution profile.

Since the emphasis is on security in terms of the guarantees and time taken to convey information within the packet-switching transmission network, various precautions are taken at the level of the network itself and its packet switches or some of them to eliminate any risk of saturation of the path taken by the information across the network, which could cause the loss of datagrams or unacceptable delays in their transmission.

At the network itself, the layouts of the virtual path are fixed in order to make the network deterministic and facilitate the a priori analysis of its behavior in all circumstances. It is on this analysis that its sizing is based. This sizing must take account of the maximum foreseeable activity of the network in normal operating conditions and must guarantee minimum bit rates for the different virtual paths that cross it, independently of the activities of the other virtual paths.

At the level of the packet switches or of some of them, the datagrams in transit undergo a verification of their integrity and the length of their stay and a verification of whether they belong to the declared virtual path. Any datagram that does not satisfy the verification is rejected while the local bit rates of the virtual paths are monitored and limited to the permissible values by an authoritarian rejection of the superfluous datagrams.

The integrity of the datagrams in transit through a packet switch is verified at the input port by which it reaches the packet switch. This verification is generally carried out by means of a Cyclical Redundant Code (CRC), by comparing the residue of this code established in the datagram in transit with the value of this residue established when this datagram was sent and transmitted with it in its service data.

The other security measures at a packet switch are implemented by the routing automaton which takes charge of them in addition to its routing task. To facilitate this taking of responsibility, it is proposed to store, in the instructed-values memory 60, not just a simple table of distribution profiles associated with the virtual paths in transit through the packet switch but a table of local descriptors of virtual paths comprising not only the distribution profiles associated with the virtual paths traveling in transit through the packet switch but also information useful to the execution of these security measures. These virtual path local descriptors may have a standard format or a special format.

A virtual path local descriptor in the standard format contains variables and constants that specify the particular features of the virtual path concerned at a packet switch, this virtual path being considered individually, independently of the other virtual paths traveling in transit through the same packet switch. A virtual path local descriptor in the special format enables a partial grouping together of several virtual paths from the viewpoint of security measures in associating common variables with them.

Figures 3, 4:
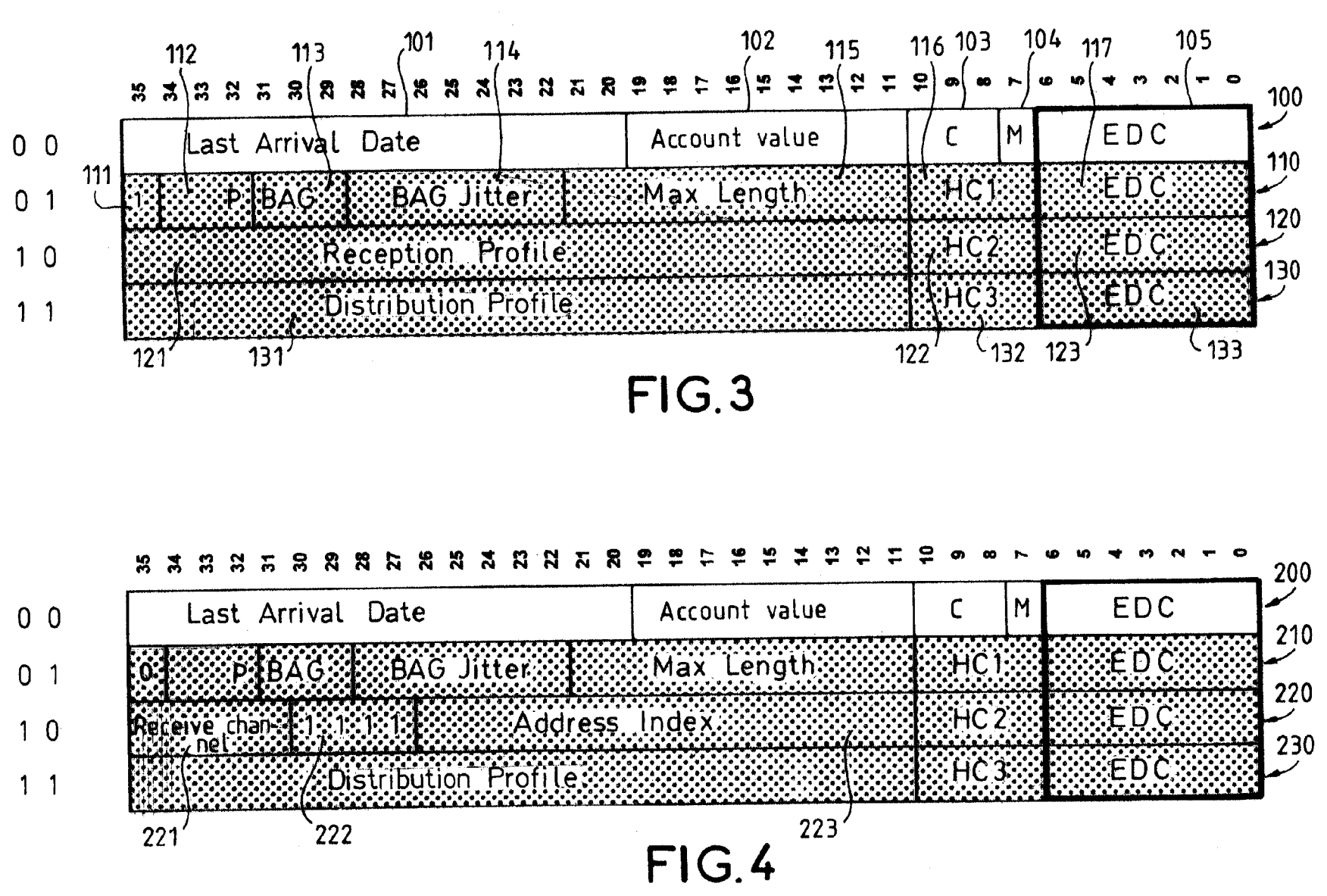

FIGS. 3 and 4 give an example of these formats of virtual path local descriptors. In this example, the virtual path local descriptors each consist of four consecutive 36-bit binary words whose basic address, in the instructed-values memory 60, identifies the virtual path concerned. The basic addresses of the local descriptors of a given virtual path may be the same in the instructed-value memories of the different packet switches: the single value chosen serves as an identifier for the virtual path throughout the network and is taken into the service data of the datagrams to identify their assigned virtual paths. This identity of the addresses, in all the packet switches, of the local descriptors pertaining to one and the same virtual path enables the packet switches to adopt a structure that is independent of their localization within the network and make this localization come into play only at a programming level.

As can be seen in FIG. 3, a virtual path local descriptor in the standard format comprises a first 36-bit binary word 100 formed by a field of variables and three 36-bit binary words, 110, 120 and 130 together constituting a field of constants.

The field of variables of the first binary words 100, shown on a blank background, contains different variables. These are:

the date 101 of the last datagram to have arrived at the packet switch considered, having the virtual path concerned as its assigned path indicated in its service data; this date is encoded on 16 bits in a first path of the variables field identified by the term "Last Arrival Date" and is used to estimate the earliest date of arrival of the next datagram assigned to the virtual path concerned as a function of the maximum data bit rate authorized for the virtual path concerned, a account value 102 giving a measurement of the permissible phase advance tolerance, with respect to the estimated date, for the arrival date of the next datagram assigned to the virtual path concerned, this tolerance being justified by the permissible jitter for the virtual path concerned at the packet switch considered, this account value being encoded on nine bits in the second part of the variables field identified by the term "Account Value", (The fields 101 and 102 may be grouped together in the form of a single field expressing the earliest date of arrival of the next datagram. This has the advantage of making more bits available to encode this single variable and, therefore, of enabling higher-precision encoding)

an account 103 of exceptional situations (the rejection of a datagram for example) encountered by the datagrams in transit in the packet switch considered and assigned to the virtual path concerned, this account of exceptional situations being encoded on three bits in a third part of the variables field identified by the letter C, a flag bit 104 indicating the addition on non-addition of a test output port in the distribution profiles of the virtual path concerned, this flag bit occupying a fourth part of the variables field identified by the letter M, and an error detection and correction code residue 105 set up on the first binary word 100 when the datagram is sent, this detection code residue being encoded on seven bits in a fifth and last part of the field of variables identified by the letters EDC.

The first word 110 of the three binary words devoted to the field of constants contains different constants, including:

a format identifier 111 indicating whether the format is a standard format or a special format, this identifier being encoded on one bit and at the level zero for the case in progress of a description of the standard format, in a first part of the binary word 110 identified by the letters A0, a priority value 112 giving a scale of priority that specifies the relative importance of the virtual paths in transit through the packet switch considered and used for the organization of the queues of datagrams to be re-sent, located at the output ports of the packet switch considered, this priority value being encoded on three bits in the second part of the binary word 110 identified by the letter P, a maximum allocated bandwidth value 113 corresponding, for example, to the maximum permissible value, per time unit, of datagrams, assumed to have a maximum length, assigned to the virtual path considered, this allocated maximum bandwidth value being encoded on three bits in a third part of the binary word 110 identified by the letters BAG, a tolerated jitter value 114 corresponding to the maximum permissible jitter for the virtual path considered at the packet switch concerned, this maximum jitter value being encoded on seven bits in a fourth part of the binary word 110 identified by the term "BAG jitter", a tolerated maximum length 115 for the datagrams assigned to the virtual path considered, this maximum datagram length being encoded on 11 bits in a fifth part of the binary word 110 identified by the abbreviation "Max. Length", a Hamming code residue 116 locking the data of the binary word 110 in combination with the address of the virtual path local descriptor considered, this Hamming code residue being encoded on four bits in a sixth part of the binary word 110 identified by the acronym HC1, and a residue of an error detection and correction code 117 applied to the first six parts of the binary word 110, this error code correction and detection residue being encoded on seven bits in a seventh part of the binary word 110 identified by the letters EDC.

The second word 120 of the three binary words devoted to the constants field contains three constants:

a first constant constituted by the reception profile 121 assigned, at the packet switch considered, to the virtual path concerned, this reception profile being encoded on 28 bits in a first part of the binary word 120 identified by the term "Reception Profile", a second constant constituted by a residue of a Hamming code 122 locking the data of the binary word 120, this Hamming code residue being encoded on four bits in a second part of the binary word 120 identified by the letters HC1, and a third constant, constituted by a residue of an error detection and correction code 123 applied to the first two parts of the binary word 120, this error code correction and detection residue being encoded on seven bits in a third part of the binary word 120 identified by the letters EDC.

The third and last word 130 of the three binary words devoted to the constants field contains three constants:

a first constant constituted by the distribution profile 131 assigned, at the packet switch considered, to the virtual path concerned, this distribution profile being encoded on 25 bits in a first part of the binary word 130 identified by the term "Distribution Profile", a second constant constituted by a residue of a Hamming code 132 locking the data of the binary word 130, this Hamming code residue being encoded on four bits in a second part of the binary word 130 identified by the letters HC2, and a third constant, constituted by a residue of an error detection and correction code 133 applied to the first two parts of the binary word 130, this error code correction and detection residue being encoded on seven bits in a third part of the binary word 130 identified by the letters EDC.

As can be seen in FIG. 4, a virtual path local descriptor in the special format, like a virtual path local descriptor in the standard format, comprises a first 36-bit binary word 200 consisting of the field of variables and three 36-bit binary words 210, 220 and 230 together forming a field of constants.

Its first binary word 200 devoted to the field of variables as well as the first word 210 and the third word 230 of its next three binary words devoted to the field of constants have the same constitution as their corresponding binary words 100, 110, 140 in the standard format, the only difference being that the format identifier 211 placed in the first part of the second binary word 210 refers to a characteristic of the special format.

The essential difference between the standard format and the special format is in the third binary word 220 in which the constant constituted by the reception profile encoded on 27 bits is replaced by:

a constant 221, known as a "reception channel" or "receive channel", consisting of a reduced reception profile indicating only one input port authorized for a datagram assigned to the virtual path concerned, this receive channel being encoded on five bits in a first part of the binary word 220 identified by the term "Receive Channel", four padding bits 222, and a constant 223, known as an "addressing index", formed by an addressing index which, in the instructed-values memory 60, points to the variables field (first binary word) of another virtual path local descriptor.

The routing automaton uses the Hamming code and error detection code EDC residues at each of its readings, in the instructed-values memory, of one or more binary words of a local descriptor to ascertain the integrity of the information extracted before using it, and re-updates these residues whenever it makes a recording in the instructed-values memory.

When it has to process a datagram received at an input port of the packet switch, the routing automaton 50 starts by extracting service data from the datagram or from the datagram routing request made by the input port that has received it and ascertains its integrity and the identity of the virtual path to which the datagram had been assigned when it was sent. Once it has acquired this identity, it uses it for the reading, in the instructed-values memory 60, of the field of variables and constants of the local descriptor associated with the virtual path concerned. Then, by means of the variables and constants read, it carries out checks on the matching of the datagram with the characteristics of the virtual path to which it is assigned. It rejects the datagram if the verifications are inconclusive or it updates the field of variables of the local descriptor consulted and routes the datagram within the packet switch if the verifications are conclusive.

To ascertain that a datagram in transit in its packet switch is matched with the virtual path assigned to this datagram when it was sent, the programmable automaton 50, after reading the virtual path local descriptor corresponding to the assigned virtual path of the datagram in the instructed-values memory 60 of its packet switch, carries out three different operations. During two first operations, it verifies the membership of the input port of the packet switch that has served as an access point for the datagram in traveling through the assigned virtual path and the compliance of the datagram with the maximum length permitted by its assigned virtual path. During the third operation, it ascertains that the transmission of the datagram in transit up to the packet switch does not imply going beyond the maximum authorized bit rate, at the packet switch, for the virtual path to which the datagram is assigned.

The verification that the input port used by the datagram to penetrate the packet switch belongs to the route authorized for the virtual path assigned to the datagram when it is sent through the transmission network consists, for the routing automaton, in ascertaining that this input port is listed in the reception profile 121 of the local descriptor read if this descriptor is in the standard format, or that it corresponds to the receive channel 221 of the local descriptor read if it is in the special format.

The verification of compliance by the datagram, during the routing in the packet switch, with the maximum length permitted by the virtual path that has been assigned to it consists, for the routing automaton, in comparing the effective length of the datagram with the maximum set value of length 115 located in the first word 110, 210 of the field of constants of the local descriptor read.

The freshness of the datagram being routed in the packet switch is verified by assessing the period of time for which it has been staying in the packet switch. This is done by evaluating the time interval between the current date and its reception date at the input port through which it accesses the packet switch and by comparing this time of stay with the threshold above which the datagram is rejected. The threshold is fixed, like the capacity of the buffer memory, during the sizing of the packet transmission network. At the packet switch, this verification of freshness is used to verify that, in the buffer memory which works as a circulating memory, the datagram has not been overwritten by more recent datagrams.

To verify the fact that, when the datagram accesses the packet switch, the maximum bit rate authorized for the virtual path assigned to the datagram at the time of dispatch has not been exceeded, the routing automaton determines the time interval separating the moment of reception of the datagram from the moment of reception of the datagram that has immediately preceded it on the same virtual path and makes an appreciation of whether this separation time interval is compatible with the maximum bit rate permitted for the virtual path considered, in taking account of a mean jitter tolerance and of the instantaneous jitter effectively detected. As an alternative, if it should be chosen to encode only one variable (the earliest date of arrival of the next datagram), it is enough to compare the current date with the date stored in the corresponding variables field to determine the acceptance of rejection of the new datagram.

The time interval that separates the moment at which the packet switch to which the routing automating belongs receives the datagram being routed from the moment of reception of the datagram that has preceded it, at the same packet switch on the same virtual path, is determined by subtracting the reception date 101 of the last datagram, indicated as the "Last Arrival Date" in the variables field 100, 200 of the descriptor read, from the date of reception of the datagram being routed by the input port that has served as an access point for the datagram.

An instruction on maximum allocated bandwidth "BAG" assigned to a virtual path at the packet switch and expressed by a maximum number of datagrams per time unit, assumed to be of maximum length, is complied with once the mean time interval, at the packet switch considered, between two successive datagrams in transit through the virtual path considered, is greater than its inverse.

The mean time interval, at the packet switch, that separates two successive datagrams in transit through one and the same virtual path cannot be directly measured because of a possibility of jitter which may affect a regular bit rate of datagrams traveling through a virtual path. This is because, at the packet switches, these datagrams go through forwarding queues whose size fluctuates as a function of the instantaneous bit rates of other virtual paths sharing the same output port.

This jitter, which affects the instantaneous value of the separating time interval but not the mean value, may be taken into account by a routing automaton as follows:

First, from the allocated maximum bandwidth instruction indicated as "BAG" in the constants field of the descriptor read, the routing automaton computes a nominal minimum separating time interval $d_{n\ min}$ to be complied with, when there is no jitter, by two datagrams following each other on the virtual path considered. It then measures the effective separating time interval that exists between the reception, at its packet switch, of the datagram being routed and the reception of the datagram that has immediately preceded it on the same virtual path. Then, depending on the history and permitted jitter tolerance indicated as "BAG Jitter" in the field of constants of the descriptor read, it verifies that the effectively measured value of the separation time interval enables medium-term compliance with the value of the minimum nominal separation time interval $d_{n\ min}$. In this verification, the reception date of the datagram being routed is compared with its expected reception date in the absence of jitter and then, the phase shifts detected on the separation time intervals between the different datagrams that have previously followed the same virtual path are added up algebraically. The lead phase shifts are deducted from and the lagged phase shifts are added to an account value amount set up the beginning, at the reception date of the datagram taken as a reference. The datagram is not selected unless, during its reception, the instantaneous value of the algebraic sum of the phase shifts detected does not exceed the authorized percentage of jitter. The management of the algebraic sum of the phase shifts is done as and when the datagrams are received on the virtual path concerned by means of the quantity 102 referenced "Account Value" of the variables word 100 or 200 of the local descriptor which, at any time, represents the maximum phase advance or account value authorized for the next datagram to come. This account value is initialized at its maximum permitted value by the permissible jitter on the date of reception of a datagram taken as a reference and then debited by the phase advance observed or credited with the phase delay observed at the reception of each subsequent datagram, its passage to a negative value expressing a crossing of the maximum bit rate authorized for the virtual path concerned and implying the rejection of the datagram concerned.

The graphs of FIGS. 5a to 5d illustrate the running of the operations performed during this verification depending on whether the datagram to be routed is in advance or delayed with respect to its expected reception date. These graphs consist of a pair of time axes on which various durations have been plotted. These durations have been measured from a point of origin $P_r$ which has taken as a reference and corresponds to the date of reception of a datagram received previously and taken as a reference. The durations include:

the minimum duration $d_{n\ min}$ of the nominal minimum separation time interval that leads to the position $p_{n\ min}$ corresponding to the expected date of reception for the next datagram when there is no jitter, the minimum lower limit $d_{l\ min}$ for the effective separation time interval between two successive datagrams, given the jitter tolerance, this limit leading to the position $pl_{min}$, the lower limit $d_a$ min effectively applied to the separation time interval measured between the datagram to be routed and the datagram preceding it on the same virtual path, this limit leading to the position $p_{a\ min}$ which corresponds to the earliest date for a licit arrival of the datagram to be routed and which may be registered in the variables word in place of the reception date of the last routed datagram and of the account value of the datagram being routed, and the duration $d_m$ of the separation time interval effectively measured between the datagram to be routed and the datagram that has immediately preceded it on the same virtual path, this duration leading to the position $p_m$.

As we have seen here above, the duration $d_{n\ min}$ of the nominal minimum separation time interval may be taken to be equal to the inverse of the instructed value of the maximum allocated bandwidth "BAG" when this instructed value is expressed in terms of a maximum number of datagrams per time unit.

The minimum lower limit $d_{l\ min}$ for the effective separation time interval between two successive datagrams, given the jitter tolerance, is taken to be equal to the duration $d_{n\ min}$ of the minimum separation time interval minus the permissible percentage of jitter indicated in the "BAG Jitter" instruction.

The lower limit $d_{a\ min}$ effectively applied to the separation time interval measured between the datagram to be routed and the datagram that has preceded it on the same virtual path corresponds to the account value. It is determined from the effective reception date of the datagrams that that have preceded the datagram to be routed on the same virtual path and is obtained from the duration $d_{n\ min}$ of the minimum nominal separation time interval supplemented by the algebraic sum of the differences in terms of plus (phase delay) or minus (phase advance) detected on the separation time intervals of the different datagrams that have followed the same virtual path. The account value is limited in such a way that the lower limit $d_{a\ min}$ remains within the range $[d_{l\ min}, d_{n\ min}]$ and is initialized at its maximum so that, at each change in the reference datagram, the lower limit da min takes the value of the minimum lower limit $d_{l\ min}$.

The verification, when the datagram accesses the packet switch, that the maximum bit rate authorized for the virtual path assigned to the datagram when it was sent out has not been exceeded is made as follows: the routing automaton, after measuring the effective time interval between the time of reception of the datagram and the time of reception of the datagram that has immediately preceded it on the same virtual path and after deducing the value of the lower limit $d_{a\ min}$ from the information contained in the local descriptor of the virtual path, verifies that the separation time interval measure is greater than the value found for the lower limit $d_{a\ min}$. This verification amounts to ascertaining that the account value remains positive. If this is the case, firstly the value of the lower limit $d_{a\ min}$ is updated or, (and this amongst the same thing) the account value is updated, by introducing the datagram to be routed into its computation and, secondly, the datagram concerned is effectively routed. If this is not the case, the datagram being routed is rejected and the next datagram that reaches the virtual path concerned is taken as a new reference. At the same time the value of the lower limit $d_{a\ min}$. is reset.

Figure 5A:
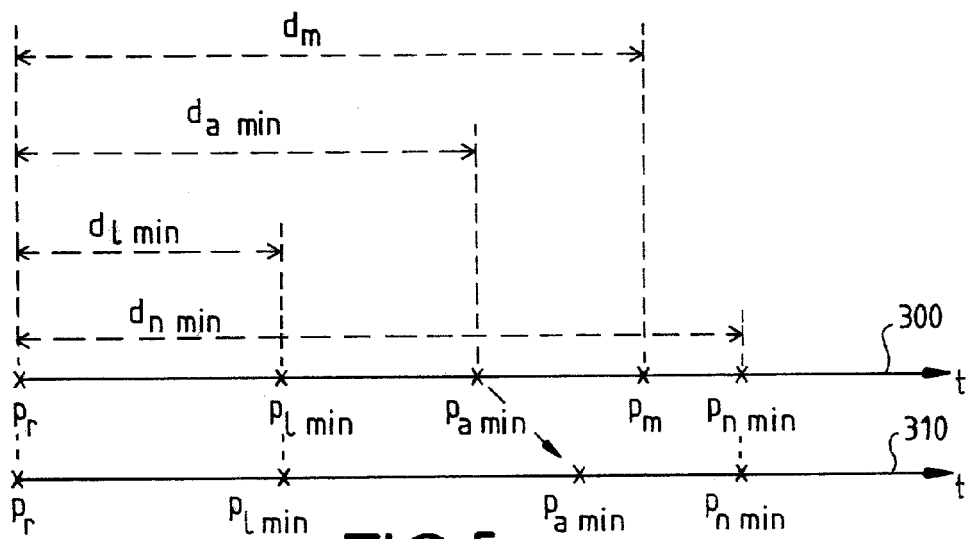
FIGS. 5a to 5d are timing diagrams illustrating the running of operations performed to verify that the maximum bit rate permitted for a virtual path is not exceeded.

In the case of FIG. 5a, the datagram to be routed arrives at an instant $p_m$, ahead of the expected date of reception $p_{n\ min}$ but within the limits permitted by the tolerated jitter because it is delayed with respect to the lower limit $d_{a\ min}$. The first time axis 300 illustrates the situation before the verification that the maximum bit rate authorized for its virtual path has not been exceeded during the reception of the datagram to be routed, and comprises a value $d_{a\ min}$ of the effective lower limit for the separation time interval determined without taking account of the datagram to be routed. The second time axis 310 illustrates the situation after it has been verified, conclusively, during the reception of the datagram to be routed, that the maximum bit rate authorized for its virtual path has not been exceeded, and after the value $d_{a\ min}$ of the effective lower limit for the separation time interval has been updated by taking account of the datagram being routed. Since the datagram being routed was ahead with respect to the expected reception date, the value $p_{a\ min}$ of the effective lower limit for the separation time interval has increased.

Figure 5B:
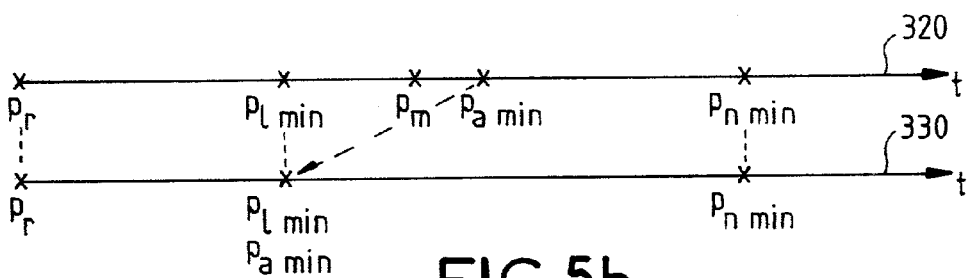

In the case of FIG. 5b, the datagram to be routed arrives at an instant $p_m$, ahead of the expected reception date $p_{n\ min}$, outside the limits permitted by the tolerated jitter because it is in advance over the lower limit $p_{a\ min}$. It is therefore rejected. The first time axis 320 illustrates the situation before it is verified, during the reception of the datagram to be routed, that the maximum bit rate authorized for its virtual path has not been exceeded. The first time axis 320 comprises a value $d_{a\ min}$ of the effective lower limit for the separation time interval, determined without taking account of the datagram to be routed. The second time axis 330 illustrates the situation after it has been conclusively verified, during the reception of the datagram to be routed, that the maximum bit rate authorized for its virtual path has not been exceeded and after a new datagram taken as a reference has been received. The value $d_{a\ min}$ of the effective lower limit for the separation time interval is initialized and taken to the value of the minimum lower limit $d_{l\ min}$.

Figure 5C:
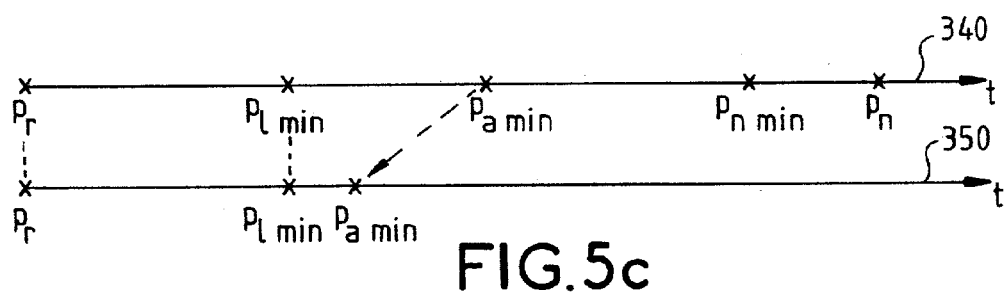

In the case of FIG. 5c the datagram to be routed arrives at an instant $p_m$, delayed with respect to the expected reception date $p_{n\ min}$ but within the limits permitted by the tolerated jitter. The first time axis 340 illustrates the situation before it is verified, during the reception of the datagram to be routed, that the maximum bit rate authorized for its virtual path has not been exceeded. The first time axis 340 comprises a value $d_{a\ min}$ of the effective lower limit for the separation time interval, determined without taking account of the datagram to be routed. The second time axis 350 illustrates the situation after it has been conclusively verified, during the reception of the datagram to be routed, that the maximum bit rate authorized for its virtual path has not been exceeded and after the value $d_{a\ min}$ of the effective lower limit for the separation time interval has been updated by taking account of the datagram being routed. Since the datagram being routed was delayed with respect to the expected date of reception, the value $d_{a\ min}$ of the effective lower limit for the separation time interval has diminished while remaining greater than the minimum lower limit $d_{l\ min}$.

Figure 5D:
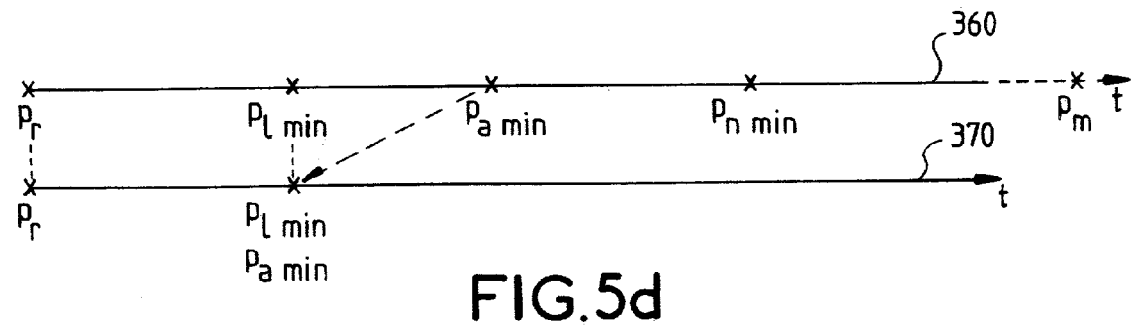

In FIG. 5d the datagram to be routed arrives at an instant $p_m$, delayed with respect to the expected reception date $p_{n\ min}$ beyond the limits permitted by the tolerated jitter. The first time axis 360 illustrates the situation before it is verified, during the reception of the datagram to be routed, that the maximum bit rate authorized for its virtual path has not been exceeded. The first time axis 360 comprises a value $d_{a\ min}$ of the effective lower limit for the separation time interval, determined without taking account of the datagram to be routed. The second time axis 370 illustrates the situation after it has been conclusively verified, during the reception of the datagram to be routed, that the maximum bit rate authorized for its virtual path has not been exceeded and after the value $d_{a\ min}$ of the effective lower limit for the separation time interval has been updated by taking account of the datagram being routed. Since the datagram being routed was delayed with respect to the expected date of reception, the value $d_{a\ min}$ of the effective lower limit for the separation time interval has diminished. However, it has not diminished as much as it should have, since it cannot become smaller than the minimum lower limit $d_{l\ min}$.

Figure 6:
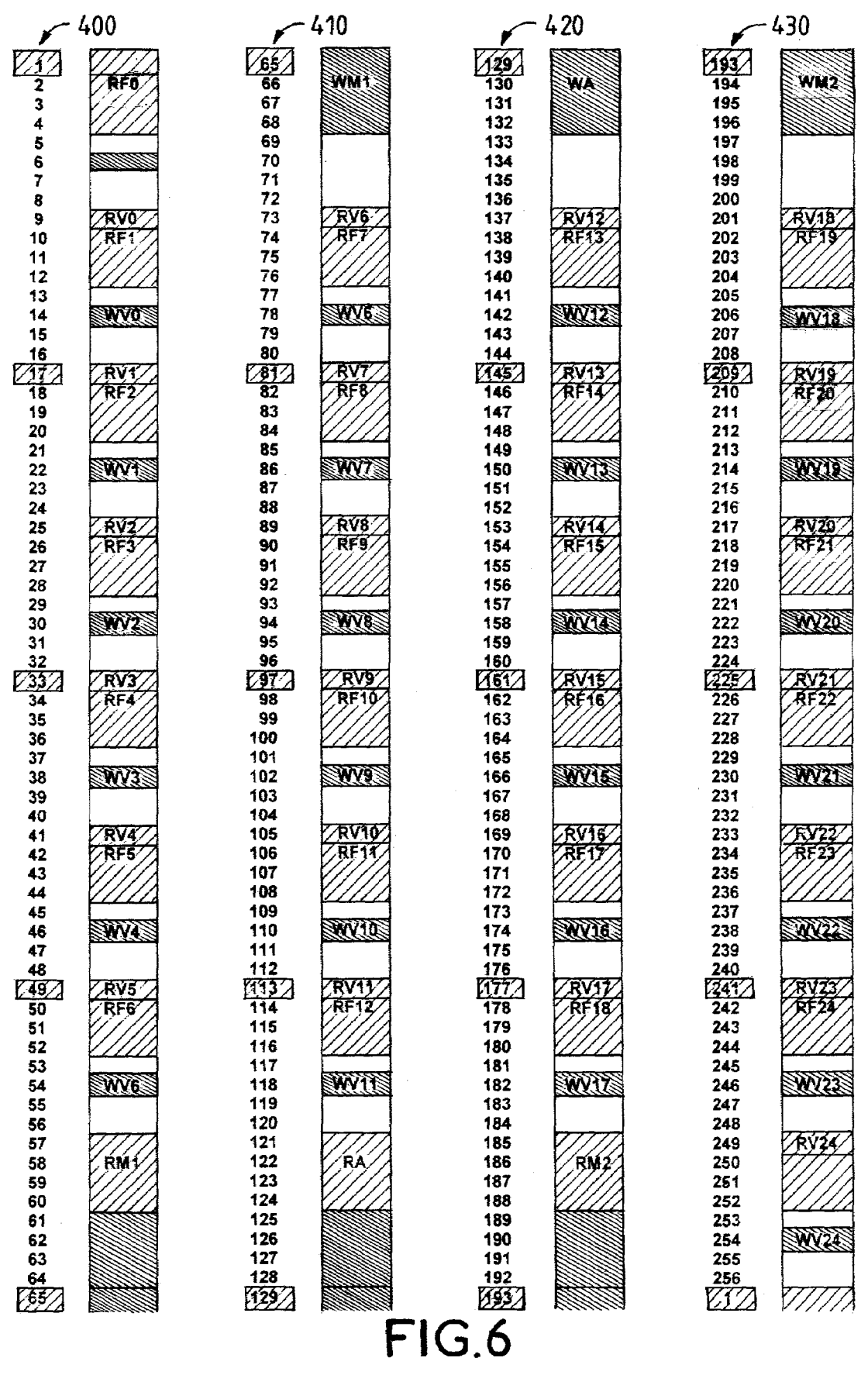

To perform these tasks, the routing automaton has its processing time divided into a repetitive and unvarying sequence of time slots apportioned between the input ports of the packet switch and the routing automaton itself. These time slots are allotted to specific elementary tasks. The majority of these time slots are used for verification of integrity and for the routing of the different datagrams reaching the input ports of the packet switch. For a same input port, they are used for a specific elementary task corresponding to the execution of a particular combinatorial and/or sequential logic processing operation performed in isolation or in parallel with an operation for the reading or writing of data in the instructed-values memory. The remaining time slots, which are in a minority, are reserved for system administration or overhead tasks such as the programming of the instructed values memory, the verification of the integrity of the data with correction, if necessary or the discarding of these data. These system administration tasks correspond, like the specific elementary tasks, to the execution of a specific combinatorial and/or sequential logic processing operation performed in isolation or in parallel with an operation for the reading or writing of data in the instructed-values memory FIG. 6 is an exemplary view of a repetitive and unvarying sequence of time slots that can be used for the organization, in the context of a packet switch with 25 input ports, of the activity of a routing automaton capable of the reading or writing, in the instructed-values memory, in one clock stroke, of the 36-bit binary word having the dimensions of the binary words forming the local descriptors. In this FIG. 6, the input ports to which the time slots are allocated numbered individually from 0 to 25. The repetitive sequence of time slots is supposed to run on 256 clock strokes enumerated in the columns 400, 410, 420 and 430. Facing these columns, it has time slots devoted to read or write operations in the instructed-values memory. These read and write operations are combined with background tasks consisting of combinatorial and/or logic processing operations, either RFi, RVi, WVi for the verifications of integrity and the routing of the datagrams that reach the different input ports of the packet switch, or RM1, WM1, RM2, WM2, RA et WA for verification and repairs to the integrity of the local descriptors stored in the instructed-values memory, for programming or for maintenance, as well as non-referenced time slots devoted solely to the execution of combinatorial and/or sequential logic processing operations.

The routing automaton accesses the routing memory during the:

- time slots RFi assigned to the reading of the constants field of the virtual path local descriptor corresponding to the virtual path announced by the datagram received by the input node numbered i. Each of them occupies three clock strokes corresponding to the time needed to read the three binary words of the constants field of a local descriptor.
- time slots RVi assigned to the reading of the variables field of the virtual path local descriptor announced by the datagram received by the input ports i. Each of them takes up only one clock stroke since a variables field takes up only one binary word in a local descriptor
- time slots WVi assigned to the writing, for updating, of variables field of the virtual path local descriptor announced by the datagram received by the input port i. Each of them occupies a single clock stroke since a variables field occupies only one binary word in a local descriptor
- time slots RA, RM1 and RM2 assigned to a read access of a full local descriptor. Each of them occupies four clock strokes since the local descriptor comprises three binary words, and
- time slots WA, WM1 and WM2 that are assigned to a read access of a full local descriptor. Each of them takes up four clock strokes, one clock stroke per binary word of the local descriptor.

The coupling of the background tasks of combinatorial and/or sequential logic processing of already-acquired data with read and write operations in the instructed-values memory reduces the influence that the limitation of the write and read bit rate of the instructed-values memory has on the execution, by the routing automaton, of the different tasks entrusted to it. At the same time, time slots devoted uniquely to combinatorial logic and/or sequential logic processing operations make it possible, when they are delayed with respect to the acquisition and restitution of data to the instructed-values memory, to finish the combinatorial logic and/or sequential logic processing begun during prior time slots in which logic processing operations were coupled with operations of access to the instructed-values memory.

To benefit from the advantages of this coupling, the routing automaton works on two datagrams at a time, taken at different stages of processing. Indeed, the time slots RVi and WVi (with 0<i<24) that correspond to read and write access to the variables field of the virtual path local descriptor announced by the datagram received at the input port i and are used at the end of processing, demarcate the time slot RF(i+1) which corresponds to the read access of the constants field of the virtual path local descriptor announced by the datagram received at the input port i+1 and is used at the beginning of processing.

The time slots RFi, RVi and WVi demarcate the time range of the processing of the datagram to be routed presented by the input port numbered i, namely, more specifically, the verification that the datagram comprises with the instructed values of the virtual path claimed by it and its routing.

The time zones demarcated by the time slots RM1 and WM1 or, respectively RM2 and WM2 are reserved for programming and consultation access operations, used when the packet switch is started, to initialize the instructed-values memory and then, when the packet switch is in operation, for the maintenance of the packet-switching network at the packet switch concerned, especially for the management of the flag bit 104 which may or may not be added to the distribution profile of the virtual path, a test port enabling access to the traffic of the virtual path by means of measurement or registration instruments.

During the time zones demarcated by the time slots RA and WA, the routing automaton verifies that the datagram reception date called the "Last Arrival Time", placed in the variables field of a local descriptor, is commensurable with the current time to prevent the ambiguities resulting from the encoding of the time which is done within a necessarily limited time scale. For each local descriptor analyzed, this verification of commensurability consists in taking the difference between the reception date known as the "Last Arrival Time" and the current time and in ensuring that it remains below the threshold taken to be equal to a limit fraction of the dynamic range of encoding of time. So long as this is the case, the two times are said to be commensurable and the verification stops at this stage. As soon as the difference proves to be greater than the threshold, the two date encoding operations can soon become incommensurable owing to a risk of overflow of the time counter. To avert this risk, a specific encoding of incommensurability is substituted for the datagram reception date known as "Last Arrival Time" and the algebraic sum of the differences known as the "Account Value" is positioned as its maximum value. The specific incommensurability encoding is then interpreted by the routing automaton as an instructed value for the selection of the next datagram received as the new reference for the verification that the maximum bit rate authorized for the virtual path has not been exceeded.

The commensurability of the datagram reception date known as the "Last Arrival Time" indicated in the variables field of a local descriptor must be done with sufficient frequency to ensure that each of the virtual path local descriptors stored in the instructed-values memory is assessed at least twice per turn of the time counter. Should a single variable be used to encode the earliest arrival date of the next datagram, the detection of incommensurability is done when the absolute value of the difference between the current date and the data stored in the variable becomes greater than a particular value chosen, like itself, to be greater than the greatest BAG constraint plus the maximum jitter. For example, a value equal to a quarter of the dynamic encoding range will be chosen to simplify the embodiment. Indeed, it is enough to subtract the two dates and compare the two most significant bits of the result obtained. If they are equal, the two dates are commensurable. If they are opposite, the time encoded in the variable has ceased to be commensurable with the current time and must therefore be explicitly encoded as such. Naturally, the task of detecting incommensurability must assess each variable with a period of less than half of the dynamic encoding range.

In addition to this verification of commensurability, the time interval demarcated by the time RA and WA is also used to cyclically verify all the local descriptors stored in the instructed-values memory, correct them in the event of simple error and invalidate them in the event of multiple errors. Indeed, the scanning, in read and write mode, of the local descriptors to verify commensurability is put to profitable use in order to verify the compatibility of each of the words of the local descriptors with the residue of the error detection and correction EDC code that it contains. Normally, the computed residue must correspond to the memorized residue. If a difference appears, it makes it possible, owing to the characteristics of the error detection and correction code, to locate an isolated error and correct it or report multiple errors. In the event of a rectifiable isolated error, the time slot WA concluding the processing time interval enables the re-recording of a corrected version of the local descriptor in the instructed-values memory. In the event of multiple errors that go beyond the correction possibilities of the EDC code, the time slot WA terminating the processing time interval enables the re-recording of an invalidated version of the local descriptor in the instructed-values memory. This invalidated version may have a variety of configurations provided that it is recognizable by the routing automaton. For example, it may have a constants field with one or all its binary words set at one. An all-at-one value of a local descriptor binary word is not necessarily valid from the viewpoint of the Hamming code but this is of no consequence because the role of the Hamming code is precisely to invalidate a local descriptor in the event of agreement between the declared residue and the recomputed residue.

What is claimed is:

1. A method of task management for a routing automaton of a packet switch forming part of a secured packet-switching transmission network and comprising several input ports and several output ports serving as points of access to incoming and outgoing data traffic using physical transmission links externally connected to the packet switch, in the form of transmission signals containing datagrams, said datagrams containing message bits and service bits containing routing instructions used for the definition, for each datagram, of a path known as a "virtual" path to be followed within the network in order to reach its destination, wherein said task management method consists firstly in providing said routing automaton with a table, stored in random access memory, of local descriptors of the virtual paths taking the packet switch considered, a local descriptor assigned to a given virtual path containing a distribution profile listing the output ports of the packet switch considered used by the virtual path concerned, a reception profile listing the input ports of the packet switch that can be used by the virtual path concerned, information on the shape and bit-rate constraints imposed on the datagrams taking the virtual path concerned and chronological information with which to determine the earliest date for a licit arrival of the next datagram taking the virtual path concerned and, furthermore, in sharing the processing time of said routing automaton in a repetitive sequence of time slots, some of which are distributed between the different input ports, each of them being individually assigned to a particular input port and being reserved for operations forming part of the routing processing of the datagrams received by its assigned input port, this processing consisting, for a datagram, of:

the reading, in the random access memory, of the virtual path local descriptor assigned to the datagram received, identified in the table of local descriptors by means of the service data drawn from the datagram received, the performance, on the datagram, of the anti-congestion safety verification operations in taking account of its date of reception by the packet switch, the identity of the input port that was used by it to access the packet switch and the information contained in the local descriptor read, either the rejection of the datagram being processed when one of the preceding verification operations is negative, or, when all the previous verification operations are positive, the updating of the chronological information used to determine the earliest date for a licit arrival of the next datagram taking the virtual path concerned and the proposing of the datagram being processed to the output ports listed in the distribution profile of the read local descriptor, with a view to the re-sending of this datagram by its output ports.

2. A method according to claim 1, wherein anti-congestion safety verification operations consist in:

verifying that the input port that has been used by the datagram being processed to access the packet switch belongs to the reception profile of the local descriptor read, verifying that the seniority of the date of reception of the datagram being processed with respect to the current date does not exceed a certain threshold, and verifying that the date of reception of the datagram being processed is within the limits permitted by the maximum bit rate authorized for the virtual path corresponding to the local descriptor read, this verification being done in taking account of its account value.

3. A method according to claim 1, wherein local descriptors are protected by an error detection and correction code enabling the detection and correction of single errors and the detection of multiple errors and wherein time slots are reserved in the processing time of the routing automaton for overhead tasks including a periodic verification of the integrity of the elements of the table of local descriptors stored in random access memory, their correction in the case of simple errors and their invalidation in the event of multiple errors, the invalidation of a local descriptor consisting in giving it a specific value representing its non-validity.

4. A method according to claim 3, wherein the overhead task devoted to the verification of the integrity of the elements of the table of local descriptors stored in random access memory includes the detection of the invalidated local descriptors and their rewriting from an archival memory located in the packet switch considered.

5. A method according to claim 3, wherein the overhead task devoted to the verification of the integrity of the elements of the table of local descriptors stored in random access memory includes the detection of the invalidated local descriptors and their rewriting from an archival memory accessible remotely through the packet-switching transmission network.

6. A method according to claim 3, wherein the specific value representing non-validity for a virtual path local descriptor is localized in the distribution profile and corresponds to a vacant distribution profile.

7. A method according to claim 1, wherein the distribution profiles in the virtual path local descriptors are permanently fixed during the designing of the packet-switching transmission network except for one bit reserved for a possible output port assigned to maintenance, whose value may be modified by the routing automaton.

8. A method according to claim 1, wherein the virtual path local descriptors all have the same length.

9. A method according to claim 1, wherein a virtual path local descriptor takes a format consisting of four successive binary words: one "variables" word and three "constants" words.

10. A method according to claim 9, wherein local descriptors take a standard format with:
a "variables" word rewritten at the end of each routing of a datagram assigned to the virtual path concerned and containing variables pertaining to the information on chronology,
a first constants word containing specifications on the maximum bit rate and the maximum jitter permissible for the virtual path considered at the level of the packet switch concerned and to the maximum length authorized for the datagram
a second constants word containing a reception profile listing the input ports of the packet switch concerned, authorized to receive a datagram assigned to the virtual path considered, and
a third constants word containing a distribution profile listing the output ports of the packet switch concerned that have to forward a datagram assigned to the virtual path considered.

11. A method according to claim 9, wherein local descriptors take a special format with:
a "variables" word rewritten at the end of each routing of a datagram assigned to the virtual path concerned and containing variables pertaining to the information on chronology,
a first constants word containing specifications on the maximum bit rate and the maximum jitter permissible for the virtual path considered at the level of the packet switch concerned and to the maximum length authorized for the datagram
a second constants word containing a reception profile reduced to a single input port and, in the place left free by the reduced definition of the reception profile, an addressing index used to point to a dating variables word common to several virtual paths, and
a third constants word containing a distribution profile listing the output ports of the packet switch concerned that have to forward a datagram assigned to the virtual path considered.

12. A method according to claim 10 or claim 11, wherein the first <<variables>> word, which is rewritten at the end of each routing of a datagram assigned to the virtual path concerned, contains variables on the reception date of the last routed datagram that has reached the packet switch considered by the same virtual path concerned and on the account value obtained by the next datagram to be routed.

13. A method according to claim 10 or claim 11, wherein the first <<variables>> word, which is rewritten at the end of each routing of a datagram assigned to the virtual path concerned, contains a variable on the earliest date of arrival to be complied with by the next datagram to be routed.

14. A method according to claim 9, wherein all the words of a virtual path local descriptor are protected by an individual error correction and detection code.

15. A method according to claim 9, wherein all the "constants" words are protected individually against errors, firstly by a Hamming code combining their addresses in random access memory and their contents and, secondly, by an error detection and correction code.

16. A method according to claim 10 or claim 11, wherein one of the words of a virtual path local descriptor contains an identifier of the format type concerned.

17. A method according to claim 1, wherein the virtual path local descriptors contain a piece of information on the counting up of the rejection situations.

18. A method according to claim 10 or claim 11, wherein the variables word of the virtual path local descriptors contains a flag enabling the addition on non-addition, to the distribution profile defined in one of the "constants" words, of an output port assigned to maintenance operations.

19. A method according to claim 1, wherein the virtual path local descriptors contain a piece of information on relative priority.

20. A method according to claim 9, wherein the specific value representing non-validity for a virtual path local descriptor is obtained by setting the three "constants" words at 1.

21. A method according to claim 10 or claim 11, wherein the repetitive sequence of time slots allocated to the different input ports during the processing cycle of the routing automaton comprises, for a same input port, a time slot assigned to the read access operations for reading "constants" words of the local descriptor addressed and assigned to taking account of the information that they contain, then a time slot for carrying out read access operations for reading a "variables" word, either of the local descriptor accessed (standard format) or of another descriptor located by means of an addressing index (special format) and, after the exploitation of the information read, a rewriting time slot for the updating of the variables word read.

22. A method according to claim 21, wherein time slots of the processing cycle of the routing automaton assigned to input ports are intermingled.

23. A method according to claim 1, applied to a packet switch provided with a central buffer memory scanned periodically in write mode by an address sequencer that makes it work like a plurality of circulating memories, one circulating memory per input port assigned to the traffic of information incoming by this port, wherein the address sequencer also provides the repetitive sequence of time slots distributing the routing automaton processing time between the different input ports of the packet switch so that the buffer memory scanning cycle and the repetitive sequence of the time slots for the sharing of the routing automaton processing time are synchronized.

24. A method according to claim 1, wherein time slots are reserved for overhead tasks in the processing time of the routing automaton, including a cyclical verification of commensurability, with the current time, of the datagram reception dates indicated in the local descriptors, said verification consisting in taking the difference between the reception date considered and the current time and in ensuring that this difference remains below a threshold taken to be equal to a limit fraction of the dynamic range of time encoding used in the packet switch concerned, a detection of incommensurability leading to an invalidation of the reception date.

* * * * *